Nov. 4, 1952     G. ARMSTRONG     2,616,123
ANIMAL AND POULTRY SNARE AND KILLER
Filed Oct. 28, 1949     2 SHEETS—SHEET 1
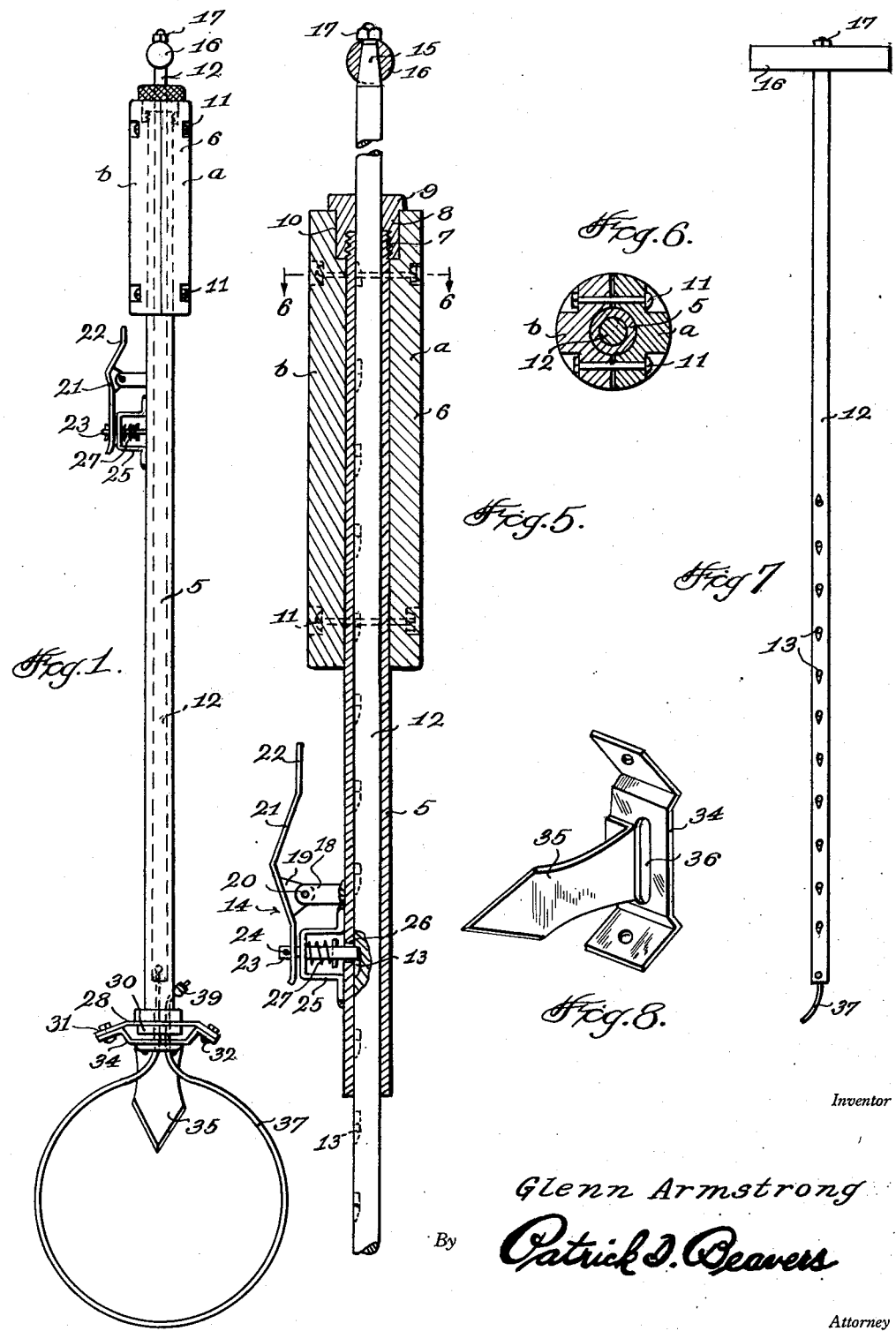
Inventor
Glenn Armstrong
By Patrick D. Beavers
Attorney Nov. 4, 1952 G. ARMSTRONG 2,616,123
ANIMAL AND POULTRY SNARE AND KILLER
Filed Oct. 28, 1949 2 SHEETS—SHEET 2
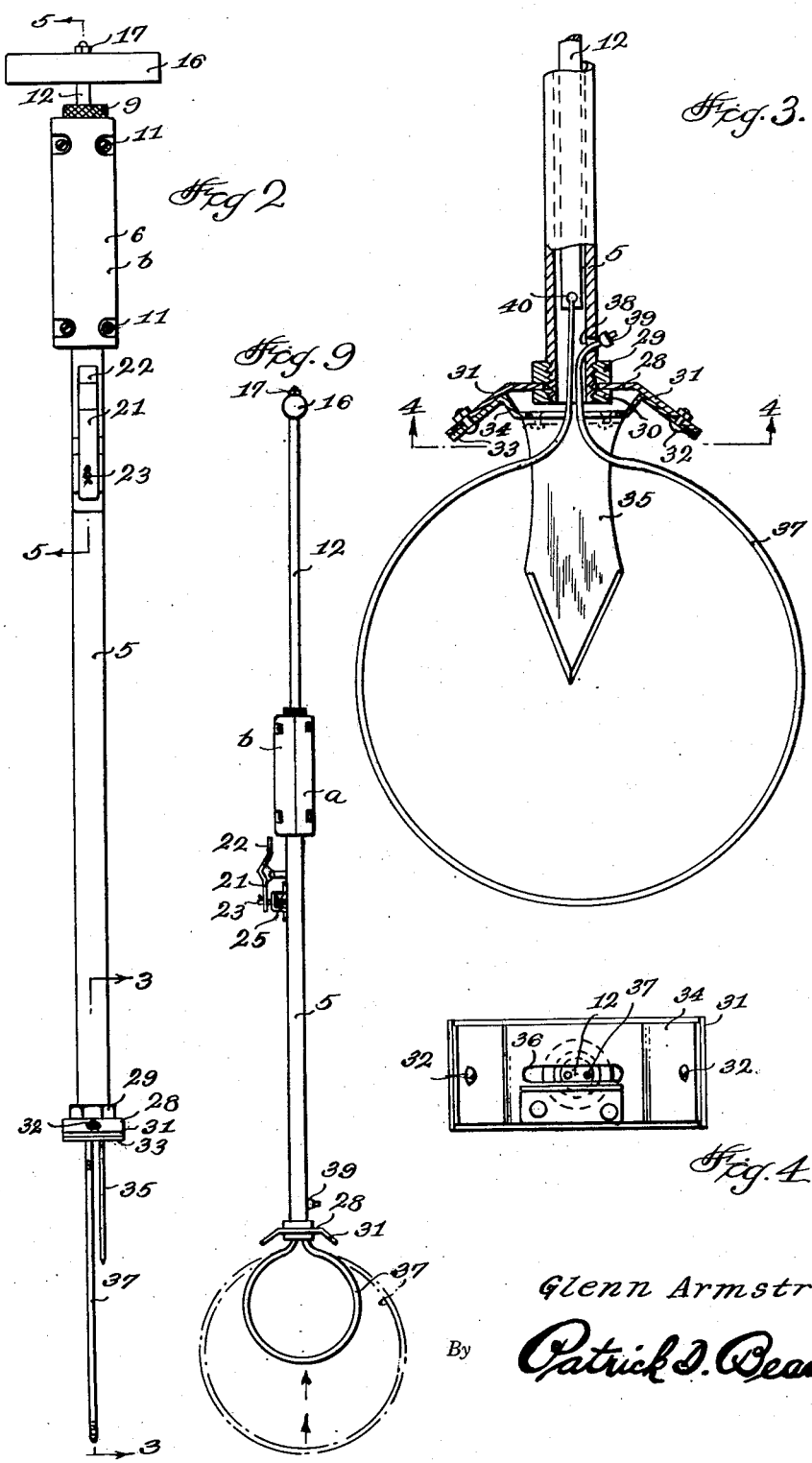
Inventor
Glenn Armstrong
By Patrick J. Beavers
Attorney Patented Nov. 4, 1952

2,616,123

UNITED STATES PATENT OFFICE 2,616,123

ANIMAL AND POULTRY SNARE AND KILLER

Glenn Armstrong, Lone Fountain, Va.

Application October 28, 1949, Serial No. 124,166

1 Claim. (Cl. 17—11)

The present invention appertains to improvements in devices for snaring animals and also poultry, either to hold the same or with the provision of an installed knife, kill the creature simultaneously with the contraction of the noose of the snare.

An important object of the present invention is to provide a simple and inexpensive manually operated snare for capturing and either holding or killing animals and poultry, in a manner that will be quickly and humanely executed.

Another important object of the invention is to provide a device of this character wherein the parts are capable of being easily assembled and disassembled, when the occasion demands.

Still another object of the invention is to provide a device of the character stated which can be easily cleaned and which will be durable and remain serviceable over a considerable period of time.

These and various other objects and advantages of the invention will become apparent to the reader of the following description.

In the drawings:

Figure 1 is a top plan view of the device;

Figure 2 is a top plan view of the device rotated 90-degrees from the position shown in Figure 1;

Figure 3 is an enlarged fragmentary detailed sectional view taken substantially on line 3—3 of Figure 2;

Figure 4 is a sectional view taken substantially on line 4—4 of Figure 3;

Figure 5 is a sectional view taken substantially on line 5—5 of Figure 2 (enlarged);

Figure 6 is a cross section taken on line 6—6 of Figure 5;

Figure 7 is an elevational view of the plunger rod;

Figure 8 is an enlarged perspective view of the knife and its bracket;

Figure 9 is a top plan view of the device, on a reduced scale, with the knife removed.

Referring to the drawings, wherein like numerals designate like parts, it can be seen that numeral 5 denotes an elongated barrel extending longitudinally in a handle 6, (which may be of wood or some other suitable material).

One end of the barrel 5 is provided with threads 7 and this portion is disposed into an internally threaded nut 8 having a flanged head 9, overlapping a counter bore 10, in which the nut 8 seats.

The handle is in a pair of sections a, b secured together in clamped position against the adjacent end of the barrel 5, by bolts 11.

Slidable through the barrel 5 and through an opening in the nut 8 is a plunger rod 12, which is formed with a plurality of recesses 13, to accommodate detent means, generally referred to by numeral 14.

One end of the rod 12 is tapered as at 15 and threaded, this end being disposed into a tapered opening at the medial portion of a cross handle 16, and a nut 17, prevents displacement of this handle 16 from this end portion of the plunger rod 12.

The detent 14 consists of a pair of lugs 18, projecting laterally from the barrel 5 and to which a web structure 19 is pivotally secured as at 20.

Numeral 21 denotes an elongated rocker carrying the web structure 19 and having a finger engageable extension 22 at one end and having its other end apertured to receive a detent pin 23. A cross pin on the pin 23 and denoted by numeral 24, prevents disconnection of the rocker 21 from the pin 23.

A U-shaped bracket 25 is welded or otherwise secured to the barrel 5 and has the pin 23 slidable therethrough and through an opening 26 in the barrel 5, in order that the inner end of the pin can engage in the recesses 13 of the plunger rod 12, it being observed that within the bracket 25 is a spring 27, urging the pin 23 toward and against the plunger rod 12.

At the remaining end of the barrel 5 is a cross plate 28. This end of the barrel 5 is threaded and the cross plate 28 has an opening therein to receive this end of the barrel 5. A pair of nuts 29, 30, one at each side of the plate 28 and being located on the threaded portion, just mentioned, of the barrel 5, serve to hold this plate in a definite position, as shown in Figure 3. The ends of the plate 28 are diverged away from the barrel 5, as at 31, 31 and secured by bolts 32 to these wing portions 31, 31, are the wing portions 33 of a bracket plate 34, to which a tapered knife 35, is secured as by welding. This bracket 34 has an elongated opening 36 therein, through which a snare loop 37 is movable, it being observed that one end of this snare loop extends through an opening 38 in the last mentioned end portion of the barrel 5, and has a stop head or button 39 thereon, to prevent return through said opening 38. The other end of the snare loop 37 is secured to the adjacent end of the plunger rod 12, as at 40.

In the use and operation of this device, with the parts assembled as substantially shown in Figures 3 and 5, it will be observed that in starting off to capture a creature, the plunger rod 12 is extended fully into the barrel 5 to afford a substantially large snare loop 37. The snare loop is then placed over the head and around the neck of the animal or fowl whereupon the rod 12 is pulled outwardly in a quick manner, contracting the snare loop 37.

At this point, it is to be understood that when the knife is not being employed and has been disconnected from the structure, by contracting the loop about a creature's neck, the animal or fowl is simply held alive for whatever disposition desired.

However, when the knife is being employed and the loop is contracted about the creature's neck, the same will draw the creature against the knife, piercing the creature's throat and instantly killing him. The pulling outwardly of the rod contracts the loop, and the loop will remain contracted, due to the fact that the detent 14 will have its pin 23 engaging in one of the recesses 13 to prevent return of the plunger rod 12.

While the foregoing description sets forth the invention in specific terms, it is to be understood that numerous changes in the shape, size and materials may be resorted to, without departing from the spirit and scope of the invention as claimed hereinafter.

Having thus described the invention, what is claimed as new is:

A device of the character described comprising an elongated barrel, a plunger reciprocally mounted in said barrel, a handle affixed to said plunger at its outer end, said barrel having a lateral opening adjacent its inner end, a plate having a pair of outwardly extending diametrically opposed ears affixed to and surrounding the barrel adjacent the inner end thereof, a bracket removably attached to said ears and having a slot centrally disposed therein, a blade affixed to said bracket and extending outwardly in the same direction as the longitudinal axes of said barrel and said plunger, a snare loop extending through the lateral opening in the barrel and having a stop head outwardly of said opening and attached at its other end to the inner end of said plunger, said loop adapted to extend through said slot in said bracket in parallel relation and adjacent to said blade when the same is affixed to said plate, and a latch for maintaining said plunger in selected positions relative to said barrel.

GLENN ARMSTRONG.

REFERENCES CITED

The following references are of record in the file of this patent:

UNITED STATES PATENTS

| Number | Name | Date |
| --- | --- | --- |
| 643,673 | Morris | Feb. 20, 1900 |
| 1,065,130 | Hoover | June 17, 1913 |
| 1,382,520 | Lundene | June 21, 1921 |
| 2,087,108 | Irvine | July 13, 1937 |

FOREIGN PATENTS

| Number | Country | Date |
| --- | --- | --- |
| 3,108 | Great Britain | Mar. 1, 1888 |
| 444,296 | France | Oct. 14, 1912 |